| United States Patent [19] | [11] 3,989,378 |
|---|---|
| Heitmann et al. | [45] Nov. 2, 1976 |

[54] METHOD FOR NO-CONTACT MEASUREMENT

[76] Inventors: Knut Heitmann, Auf dem Gorg 4; Eckart Schneider, Lauerstrasse 3, both of 633 Wetzlar; Hermann Eisenkopf, Eichendorffstrasse 10, 6335 Nauheim, all of Germany

[22] Filed: June 19, 1974

[21] Appl. No.: 480,822

Related U.S. Application Data

[63] Continuation of Ser. No. 283,967, Aug. 28, 1972, abandoned.

[30] Foreign Application Priority Data

Sept. 9, 1971  Germany............................ 2144487
Dec. 8, 1971  Germany............................ 2160877

[52] U.S. Cl. .................................... 356/28; 356/4; 356/167
[51] Int. Cl.² ................................................ G01P 3/36
[58] Field of Search ..................... 356/28, 4, 5, 167

[56] References Cited
UNITED STATES PATENTS

| 2,772,479 | 12/1956 | Doyle | 356/28 |
| 3,198,061 | 8/1965 | Hock | 356/169 |
| 3,482,107 | 12/1969 | Hock | 356/28 |
| 3,856,403 | 12/1974 | Maughmer | 356/28 |

FOREIGN PATENTS OR APPLICATIONS 1,249,302  10/1971  United Kingdom

*Primary Examiner*—Maynard R. Wilbur
*Assistant Examiner*—S. C. Buczinski
*Attorney, Agent, or Firm*—Gilbert L. Wells

[57] ABSTRACT

Method for no-contact measurement of the relative velocity, position, or displacement path of objects without special optical markers with respect to a reference position in at least one coordinate direction, or of the degree of image quality of an image wherein the apparatus images the object on a grating and the light fluxes leaving this grating are measured by means of photoelectric elements. The output signals of the photoelectric elements exhibit a frequency component proportional to the velocity of travel. The present invention is distinguished from the prior art by having a physical beam splitter (6,13) inserted in the imaging beam path in front of the grating (5,14), and preferably several polarizing beam splitters (7,30-33) with at least respectively one associated photoelectric receiver pair (10,11,16-19 16'-19') are connected after the grating (5,14).

2 Claims, 3 Drawing Figures

METHOD FOR NO-CONTACT MEASUREMENT

This is a continuation of application Ser. No. 283,967, filed Aug. 28, 1972, now abandoned.

BACKGROUND OF THE INVENTION

This invention relates to devices for making a no-contact measurement of the relative velocity, position, or diplacement path of objects without the use of special optical markers relative to a reference position in at least one coordinate direction, or of the degree of image contrast. The object is imaged on a grating and the light fluxes leaving this grating are measured by means of photoelectric means. The output signals of the photoelectric means exhibit a frequency component proportional to the velocity of travel.

Optical speed measuring devices are known wherein the relative movements of an object with respect to a photoelectric receiver produce measuring variables dependent on the relative velocity. In this connection, three different methods are basically employed:

In the first method, the object to be measured is irradiated with a monochromatic coherent radiation; the light scattered on the object is detected, the frequency of which is affected due to Doppler shift; and then the frequency of the scattered light is measured by interference with the primary radiation or with light freuquency-shifted in the opposite direction. This conventional procedure as disclosed in J. T. Ator: Image Velocity Sensing by Optical Correlation Applied Optics, August 1966 Vol. 5, Nr. 8, 1935 necessitates an expenditure in apparatus due to the required lasers and interferometers, which is in many cases intolerable.

With the second method, the object moved is reproduced in an image plane wherein at least two photoelectric scanners offset in the direction of movement are disposed. The signal of the first scanner, arranged as the first in the direction of motion, is stored, for a preselected time in a short-time storage means and thereafter compared, in a correlator, with a signal supplied by the subsequent, second scanner displaced at a distance along the path of movement. In this connection, the storage time $\tau$ is controlled so that the signal of the second scanner is chronologically congruent with the delayed signal of the first scanner. In this case, the velocity of the object image relative to the scanners, from which the object velocity $v_o$ is obtained via the imaging scale, results as:

$$v'_o = c/\tau$$

This conventional process as disclosed in F. Mesch, H.H. Daucher, R. Frische: Geschwindigkeitsmessung mit Korrelationsverfahren, Messtechnik 8, 1971 requires, with a controllable storage means and a correlator, a complicated, trouble-prone accumulation of apparatus and yields only an average velocity, obtained by averaging over the storage time $\tau$.

According to the third method, the object moved is reproduced on a grating having a number of $k$ lines per mm. Behind this grating a photoreceiver receives the light coming from the object and preferably yields an alternating voltage upon the presence of a specific position frequency in the brightness distribution of the object. The frequency $f$ of this alternating voltage is proportional to the velocity $v$ of the object image relative to the grating and to $k$. The following applies:

$$f = v \cdot k$$

This signal is superimposed by longer-cycle signals (constant light) corresponding to the integral over the image portions with position frequencies which do not correspond to $k$. In order to suppress this constant light proportion, a device is known with a special pair of photoelectric receivers with telescoped, strip-shaped electrodes. This device supplies a push-pull signal only from image portions having a position frequency corresponding to $k$, and the in-phase portions of other signals are eliminated by a difference-forming bridge circuit. The special photoelectric receivers of this conventional device which is disclosed in German Published Patent Applicatiton 1,564,450 again require great expenditure, because of their difficult geometry and, since they cannot be produced at any desired fineness they limit the number of strips. The number of strips is directly connected to the measuring accuracy of the system.

It is known to measure movements of a real image of an object by introducing a grating into the image plane, collecting the light flux penetrating this grating in a photoelectric receiver, and determining the frequency of an A.C. component of the photoelectric current produced by the changing combined effect of the image with the grating structure. The possibilities for using such devices are very limited, due to the poor signal-to-noise ratio. One method of the type mentioned above and disclosed in British Patent No. 1,249,302 is able to overcome this deficiency by providing, as the grating, periodic arrangements of planar surfaces in a prismatic or pyramidal form, so that the light flux emanating from the object is collected in various directions by various photoelectric receivers. By this beam splitting method, it is possible to obtain, from the output signals of the photoelectric receivers, push-pull signals of an increased signal quality, from the frequency of which the travel velocity is determined. However, this method has the disadvantage that it yields signals which are ambiguous with regard to the arithmetic sign of the travel direction. However, the arithmetic sign of the movement is of importance in many practical cases, especially when it is intended to keep aiming devices directed to the measuring objects, by means of servo mechanisms.

SUMMARY OF THE INVENTION

Therefore, it is an object of the present invention to provide a device of the above-described type yielding signals with a correct arithmetic sign, wherein the aforementioned disadvantages of conventional devices are avoided in an extremely simple manner. This is readily realized with the aid of commercially available optical and electronic components and the apparatus of the present invention exhibits great flexibility with regard to the special peculiarities of existing measuring objects.

This object is attained by providing a device which is distinguished in that a physical beam splitter is inserted in the imaging beam path in front of the grating, and, after the grating, preferably several polarizing beam splitters are connected with at least respectively one pair of photoelectric receivers associated therewith. In the imaging beam path, a double-refracting beam splitter is provided which produces, in the plane of the grating, two images displaced with respect to each other by one-half grating constant. A pair of photoelectric receivers is connected after the grating via a polarizing beam splitter. For the purpose of measuring in accordance with two coordinate directions, in another embodiment, a prismatic or pyramidal grid is provided as the grating. This pyramidal grid corresponds in its preferred directions to the desired coordinate directions. In the imaging beam path in front of this grid, a physical beam splitter is mounted effecting the splitting of the image preferably in the direction of the angle bisector between the two measuring coordinate directions. With the use of orthogonal coordinates, the image splitting in the grating plane is preferably $P/4 \sqrt{2}$ or an odd multiple thereof, wherein P is the cycle length of the grid structure. Four photoelectric receiver groups are connected after the grid, consisting preferably of respectively one condenser, a splitter adapted to the physical beam splitter, as well as two photoelectric receivers. The receiver groups receive the light beams deflected by the grating. During this procedure, electric push-pull signals which are preferably shifted in their phase by 90° with respect to one another are produced for the determination of the magnitude and direction of the movement of the object to be measured. As a physical beam splitter, a polarizing, image-splitting element is provided. It is also possible to provide means for the defined, preferably continuous movement of the grating relative to the optical axis of the device.

The particular advantage of the present invention as compared to the prior art resides in that it permits the use of gratings having a high line number with the employment of push-pull signals, and this has a considerable beneficial effect on the signal quality and thus on the measuring accuracy.

BRIEF DESCRIPTION OF THE DRAWINGS

Embodiments of the novel device are illustrated in the drawings and described hereinbelow.

DESCRIPTION OF THE PREFERRED EMBODIMENTS

Figure 1:
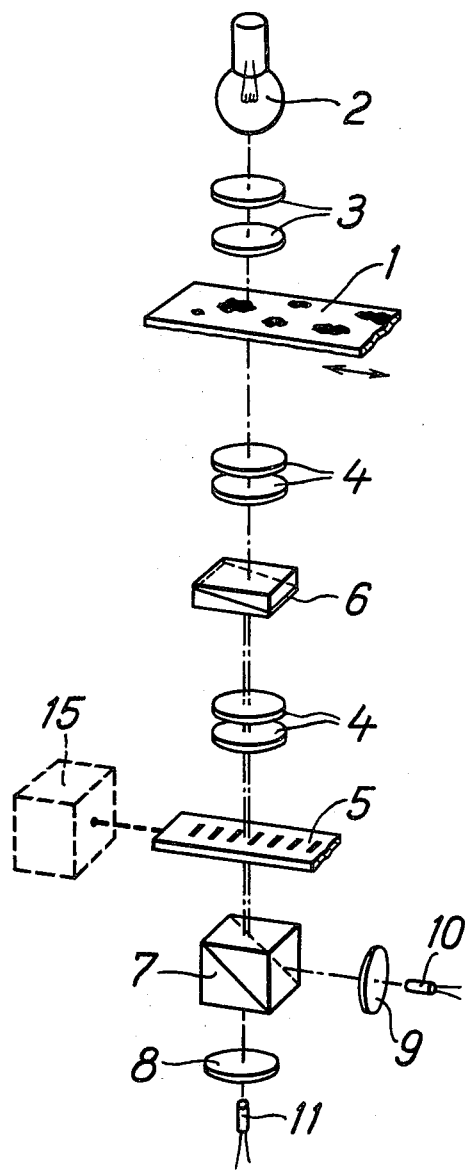
FIG. 1 is a schematic showing of a novel device for measuring according to one coordinate direction.

In FIG. 1, numeral 1 denotes a moving, transparent object, the relative velocity of which is to be measured in transmitted light. This object 1 is illuminated by a lamp 2 via a condenser 3 located along the optical axis. An objective 4 reproduces the object in the plane of a grating 5. A Wollaston prism 6 disposed between the objective lenses produces, by double refraction, two images of the object offset in the grating plane 5 by one-half grating constant vertically to the lines of the grating and vertically to the optical axis. The light of respectively one image is fed, after filtering through the grating 5, to respectively one of the photoelectric receivers 10, 11, via a polarizing beam splitter 7 and condensers 8, 9.

Since the object structure, as indicated by dark areas on the object 1, transmits the light in different strengths, the output signals of the photocells 10, 11 contain variable constant proportions in accordance with the chronological change in the brightness distribution in the plane of the grating 5 due to the movement of the object 1. By superimposing the object structure on the structure of the grating, those image structure components are filtered out, the position frequency of which corresponds to the grating constant. Additional image proportions of a lower frequency are passed through as an interfering component of constant light. The same applies with regard to the image displaced by one-half grating constant, but with the difference that only the position frequency corresponding to the grating constant is phase-shifted by 180° with respect to the first-mentioned position signal. By subsequently forming the difference between the electrical signals obtained from the two image components, the in-phase constant light proportions are eliminated, and the anti-phase signal proportions of the filtered-out position frequency are added. Upon movement of the object, the position frequency is then converted into a speed-proportional time frequency and measured in a conventional manner, as disclosed in German Published Patent Application 1,564,450 (North American Aviation).

It is, of course, also possible with a fixed position of the object, to move the grating 5 relatively to the optical axis of the device in a defined manner such as by means of a drive 15, as shown in dashed lines. If this is done, for example, uniformly in one direction, a time frequency is obtained at the output of the receiver with the object being stationary and this time frequency is only proportional to the traveling velocity of the grating 5. In contrast thereto, when the object is moved, a time frequency is obtained which, depending on the traveling direction of the object, is proportional either to the sum or to the difference of object velocity and grating velocity. From these signals, in a conventional manner as disclosed in U.S. Pat. No. 2,782,626 the magnitude and direction of the movement of the object is determined by comparison with a signal derived only from the grating movement (e.g. by means of a phase-sensitive rectifier).

When the local position is to be measured, the number of cycles traversed must be counted at the output of the comparator, taking into account the existing direction information.

Figure 2:
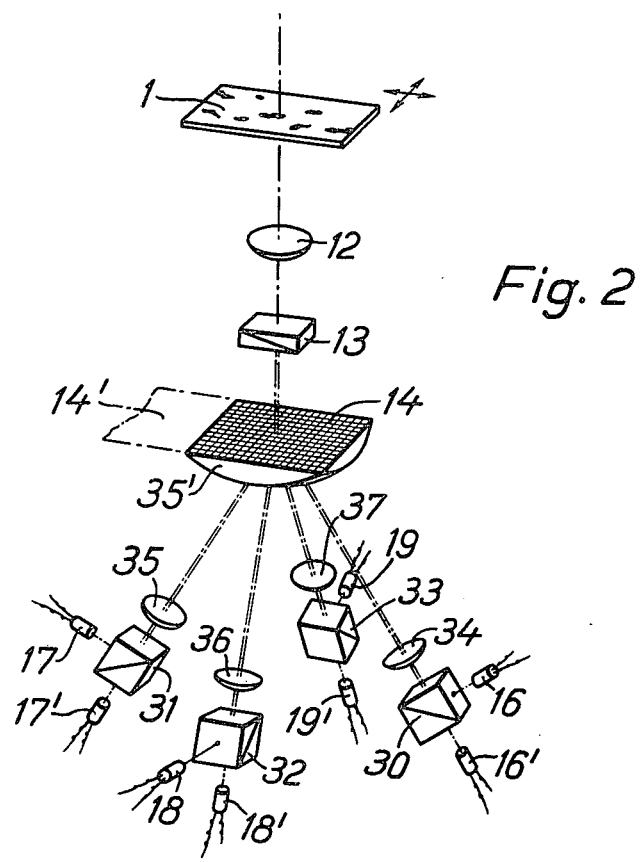
FIG. 2 is a schematic showing of a novel device for measuring along two coordinate directions.

In the illustration of FIG. 2, the object 1 to be measured is located along the optical axis and is imaged in an image plane 14' perpendicular to the optical axis via an objective 12. In this image plane, a pyramidal grid 14 is disposed attached to a field lens 35'. A Wollaston prism 13 is provided as a physical beam splitter between the objective 12 and the image plane 14'. Four photoelectric receiver groups are connected after the field lens 35', and these groups consist of the condensers 34–37, polarizing beam splitters 30–33 connected thereto, as well as photoelectric receivers 16–19 and 16'–19'. The orientation of the Wollaston prism 13 as well as of the polarizing beam splitters 30–33 is selected so that the splitting direction of the Wollaston prism coincides with the angle bisector between the coordinate directions determined by the pyramids of the grid. The electronic circuitry required for an evaluation of the thus-obtained signals is conventional and is disclosed in U.S. Pat. No. 3,508,834.

Figure 3:
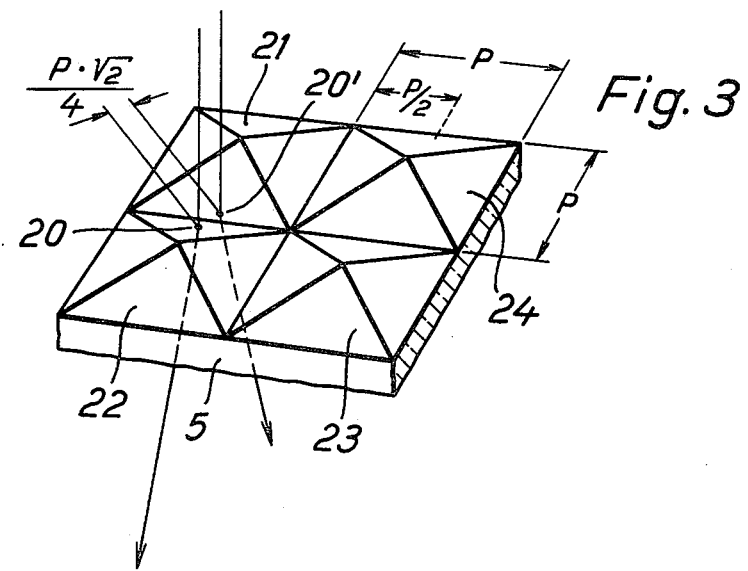
FIG. 3 is a perspective showing of the pyramidal grid used in the image splitting apparatus of FIG. 2.

With respect to the mode of operation, a single illuminated object point is contemplated hereinbelow, as illustrated in FIG. 3. A pair of image points, 20,20' originating from this object point and produced by double refraction is disposed in the plane 14' of the pyramidal grid 14. For purposes of simplification, it is assumed that the pyramids are square and exhibit a side length P. Only a segment of the grid is under observation, exhibiting four pyramids 21–24. The distance of the image points is equal to a quarter of the base diagonal of the pyramids (P/4 √2), and they have complementary light polarization. In the illustrated position, the light of point 20 is assumed to impinge on the receiver 18, the light of point 20' on the receiver 19' according to FIG. 2. If the plurality of the image points pertaining to an object, as here illustrated for points 20, 20', travels for example, toward the pyramid 24 in the splitting direction, the light of point 20' for example, impinges successively on the receivers 19', 17', 16', 18', and the light of point 20 on the receivers, 18, 19, 17, 16. The receivers 18, 19 and 18', 19' alternate in their emission of a signal with respect to the pair of points. The signal from 18', 19', composed of the energy of many points, has the same shape as that from 18, 19, but is phase-shifted with respect to the latter by 90°.

If, in the just discussed directional orientation of the pair of image points 20, 20', the signal of receivers 18', 19' precedes the signal of 18, 19 by 90°, the reverse takes place when the movement is reversed in direction, i.e., 19, 18 then precedes 19', 18' by 90°. Consequently, the arithmetic sign of the movement in the splitting direction is fixedly determined. The magnitude and/or velocity of the movement are obtained in a conventional manner from the periodicity or frequency of the alternating signals resulting from the movement of a plurality of image points as disclosed in J. T. Ator: Image Velocity Sensing by Optical Correlation Applied Optics, August 1966, Vol. 5, Nr. 8, 1325.

The thus-produced push-pull signals are evaluated in a known manner by difference and/or sum formation as disclosed in U.S. Pat. No. 3,508,834.

We claim:
1. In a method for the no-contact measurement of the relative velocity, position or displacement path of an object with respect to a reference position in at least one coordinate direction, or of the degree of image definition of an image, the improvement comprising the steps of:
   a. illuminating an object of stochastic structures randomly distributed and without special ruled markings;
   b. utilizing light fluxes emanating from said object for forming an image of said object in an image plane;
   c. producing discernible images of said object;
   d. mounting in said image plane an optical structure of repetitive pattern displaying a specific spatial frequency component to receive said object images and to filter from said image structures a structure component corresponding with said spatial frequency component;
   e. generating from said filtered light fluxes at least one pair of optical push-pull signals;
   f. separating said optical push-pull signals in at least two directions; and
   g. generating from said optical push-pull signals electrical output signals which exhibit a frequency component being proportional to the velocity of travel of said object relative to a fixed reference point.
2. The method of claim 1, further comprising the step of effecting a continuous relative movement between said optical structure and said object images.

* * * * *